(12) United States Patent
Rajkhowa et al.

(10) Patent No.: US 11,783,403 B2
(45) Date of Patent: Oct. 10, 2023

(54) SYSTEMS, NON-TRANSITORY COMPUTER READABLE MEDIUMS, AND METHODS FOR GROCERY ORDER BATCHING AND CUSTOMER EXPERIENCE

(71) Applicant: Wal-Mart Apollo, LLC, Bentonville, AR (US)

(72) Inventors: Pratosh Deepak Rajkhowa, Sunnyvale, CA (US); Sneha Narahalli Balasubramanya, San Jose, CA (US); Manish Gupta, Sunnyvale, CA (US); Deepak Deshpande, San Jose, CA (US); Hagit Katzenelson, Palo Alto, CA (US); Rohit Jain, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/393,880

(22) Filed: Apr. 24, 2019

(65) Prior Publication Data

US 2020/0342517 A1 Oct. 29, 2020

(51) Int. Cl.
*G06Q 30/00* (2023.01)
*G06Q 30/0601* (2023.01)
(Continued)

(52) U.S. Cl.
CPC ......... *G06Q 30/0635* (2013.01); *G06F 16/29* (2019.01); *G06Q 10/0836* (2013.01)

(58) Field of Classification Search
CPC .................. G06Q 30/0635; G06Q 10/0836
(Continued)

(56) References Cited

U.S. PATENT DOCUMENTS 7,962,422 B1\* 6/2011 Melechko .............. G06Q 10/08
705/1.1
9,269,103 B1\* 2/2016 Kumar .................... H04W 4/80
(Continued)

OTHER PUBLICATIONS

Moons, S., Ramaekers, K., Caris, A., & Arda, Y. (2018). Integration of order picking and vehicle routing in a B2C e-commerce context. Flexible Services and Manufacturing Journal, 30(4), 813-843. doi:https://doi.org/10.1007/s10696-017-9287-5 (Year: 2018).\*

*Primary Examiner* — Arielle E Weiner
(74) *Attorney, Agent, or Firm* — Morgan, Lewis & Bockius LLP; Manita Rawat

(57) ABSTRACT

This application relates to apparatus and methods for batching orders for delivery. In some examples, a computing device may obtain order data identifying at least a first order and a second order. The computing device may determine whether the first order can be delivered to a first delivery address and the second order can be delivered to a second delivery address within a delivery time window. Based on the determination, the computing device may batch the first order and the second order to generate a batched order. In some examples, the computing device determines if the delivery vehicle can store the items for the first order and the second order to determine whether the orders may be batched. The computing device may generate assignment data identifying an assignment of the batched order to a delivery vehicle, and may transmit the assignment data to another computing device.

20 Claims, 10 Drawing Sheets

(51) Int. Cl.
*G06Q 10/0836* (2023.01)
*G06F 16/29* (2019.01)

(58) Field of Classification Search
USPC ..................................................... 705/26.81
See application file for complete search history.

(56) References Cited

U.S. PATENT DOCUMENTS

| | | | | |
|---|---|---|---|---|
| 10,133,995 | B1* | 11/2018 | Reiss | G06Q 10/063114 |
| 11,403,133 | B1* | 8/2022 | Schmalzle | G06F 9/4881 |
| 2015/0324944 | A1* | 11/2015 | Lord | G06Q 50/30 |
| | | | | 705/7.13 |
| 2017/0046644 | A1* | 2/2017 | Zhang | G06Q 10/06315 |
| 2017/0293886 | A1* | 10/2017 | Bostick | G06Q 10/08355 |
| 2018/0025321 | A1* | 1/2018 | Chen | H04W 4/029 |
| | | | | 705/338 |
| 2018/0032928 | A1* | 2/2018 | Li | G06Q 10/08 |
| 2018/0260787 | A1* | 9/2018 | Xi | G01C 21/3438 |
| 2018/0315319 | A1* | 11/2018 | Spector | G06Q 50/28 |
| 2018/0341918 | A1* | 11/2018 | Raut | G08G 9/00 |
| 2019/0114583 | A1* | 4/2019 | Ripert | G06Q 10/0833 |
| 2019/0213536 | A1* | 7/2019 | Mehring | G06Q 10/0838 |
| 2019/0263219 | A1* | 8/2019 | Spath | B60H 1/00264 |
| 2020/0160268 | A1* | 5/2020 | Han | G06N 3/08 |
| 2020/0219049 | A1* | 7/2020 | Li | G06Q 10/0832 |

* cited by examiner

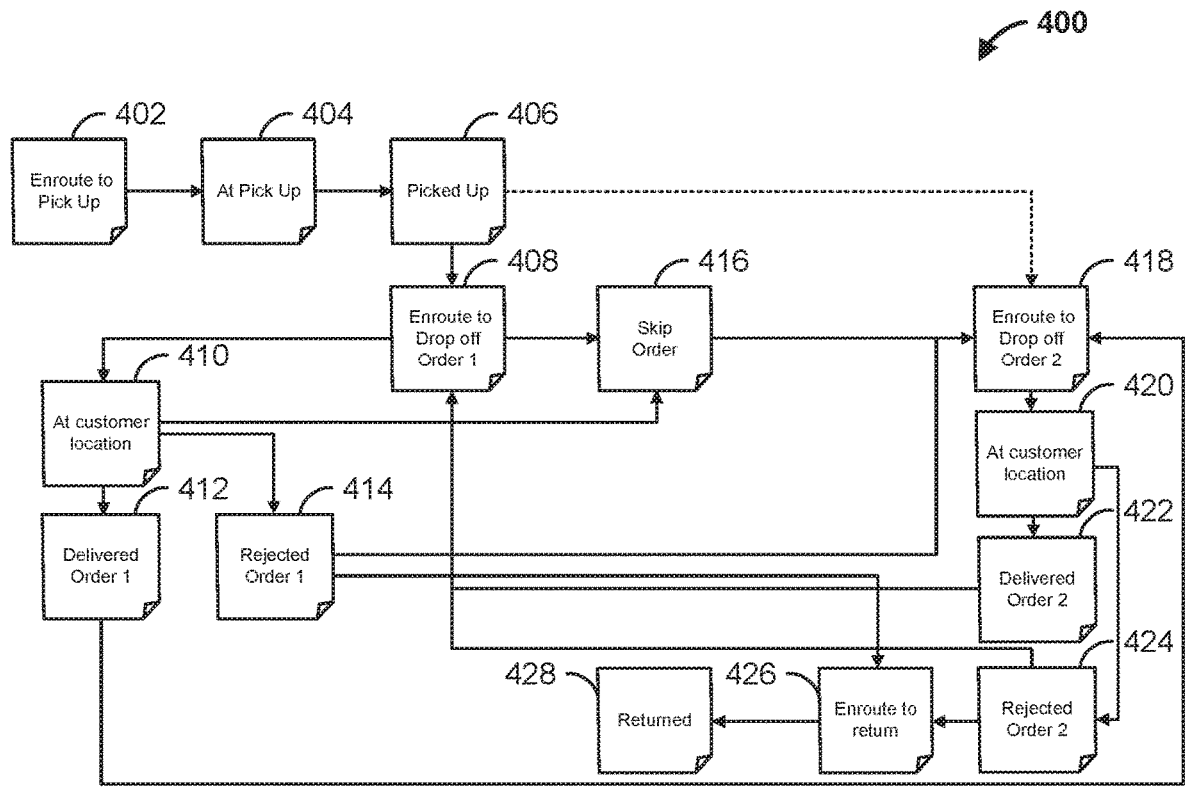

FIG. 4A

| Order 1 Initial | Order 2 Initial | Order 1 Next | Order 2 Next |
|---|---|---|---|
| Enroute to drop off Action - Skips | Picked Up | Skipped | Enroute to drop off |
| At customer location Action - Skips | Picked Up | Skipped | Enroute to drop off |
| Rejected | Picked Up | Rejected | Enroute to drop off |
| Skipped | Rejected | Enroute to drop off | Rejected |
| Skipped | Delivered | Enroute to drop off | Rejected |
| Rejected | Rejected Action - Return | Enroute to Return | Enroute to Return |
| Rejected Action - Return | Rejected | Enroute to Return | Enroute to Return |

FIG. 4B

| | 1PM – 3PM | 3PM – 5PM | 5PM – 7PM | 7PM – 9PM |
|---|---|---|---|---|
| 505 | X <br> 505a | ___ <br> 505b | ___ <br> 505c | ___ <br> 505d |
| 510 | N/A <br> 510a | X <br> 510b | X <br> 510c | ___ <br> 510d |
| 515 | N/A <br> 515a | ___ <br> 515b | N/A <br> 515c | ___ <br> 515d |
| 520 | N/A <br> 520a | ___ <br> 520b | N/A <br> 520c | X <br> 520d |
| 525 | X <br> 525a | X <br> 525b | N/A <br> 525c | N/A <br> 525d |

FIG. 5B

SYSTEMS, NON-TRANSITORY COMPUTER READABLE MEDIUMS, AND METHODS FOR GROCERY ORDER BATCHING AND CUSTOMER EXPERIENCE

TECHNICAL FIELD

The disclosure relates generally to delivery services and, more specifically, to delivery management systems.

BACKGROUND

At least some retailers deliver purchased goods, such as groceries, to a customer. When an order is placed, the retailers must gather the purchased goods and place them on a vehicle, such as a truck, for delivery. The delivery vehicle may collect the purchased goods for an order from a warehouse or store, and deliver the purchased goods to a customer at a specified delivery address, such as to the customer's home. Some delivery management systems allow a customer to select a delivery window specifying a range of time when the goods may be delivered. Similarly, some delivery management systems allow delivery drivers to schedule times when they are available for delivery.

These delivery management systems, however, have drawbacks. For example, drivers may be scheduled to deliver orders that, due to poor scheduling, cannot be delivered on time, e.g., within the requested delivery window. In some examples, purchased goods may perish before they are delivered. For example, ice cream may melt, or meat may spoil, before they are delivered. In yet other examples, purchased goods may go undelivered because no one was at the delivery location to accept the delivery. Therefore, for these and other reasons, current delivery management systems have drawbacks.

SUMMARY

The embodiments described herein may optimize delivery management systems and services by, for example, improving and/or ensuring on-time deliveries, reducing the number of undelivered orders, or more efficiently scheduling delivery vehicle drivers. As a result, a retailer employing one or more of these embodiments may be benefit by expending less effort and time in scheduling activities. The retailer may also enjoy a reduction in delivery times and undelivered goods, which may lead to an improvement in customer service and/or a reduction in delivery costs. Other benefits may also be recognized by those skilled in the art.

In some embodiments, a computing device is configured to obtain order data identifying at least a first order and a second order, where each order is for at least one item. The computing device may determine whether the first order can be delivered to a first delivery address and the second order can be delivered to a second delivery address within a delivery time window. The computing device batches the first order and the second order to generate a batched order if the computing device determines that the first order can be delivered to the first delivery address and the second order can be delivered to the second delivery address within the delivery time window. In some examples, the computing device determines whether the delivery vehicle can store the items for the first order and the second order, and batches the first order and the second order if the delivery vehicle can store the items for the first order and the second order. The computing device may also generate assignment data identifying an assignment of the batched order to a delivery vehicle, and may transmit the assignment data to another computing device.

In some embodiments, a method is provided that includes obtaining order data identifying at least a first order and a second order, where each order is for at least one item. The method may include determining whether the first order can be delivered to a first delivery address and the second order can be delivered to a second delivery address within a delivery time window. The method may also include batching the first order and the second order to generate a batched order if the first order can be delivered to the first delivery address and the second order can be delivered to the second delivery address within the delivery time window. In some examples, the method includes determining whether the delivery vehicle can store the items for the first order and the second order, and batching the first order and the second order if the delivery vehicle can store the items for the first order and the second order. The method may also include generating assignment data identifying an assignment of the batched order to a delivery vehicle, and transmitting the assignment data to another computing device.

In yet other embodiments, a non-transitory computer readable medium has instructions stored thereon, where the instructions, when executed by at least one processor, cause a device to perform operations that include obtaining order data identifying at least a first order and a second order, where each order is for at least one item. The operations may include determining whether the first order can be delivered to a first delivery address and the second order can be delivered to a second delivery address within a delivery time window. The operations may also include batching the first order and the second order to generate a batched order if the first order can be delivered to the first delivery address and the second order can be delivered to the second delivery address within the delivery time window. In some examples, the operations includes determining whether the delivery vehicle can store the items for the first order and the second order, and batching the first order and the second order if the delivery vehicle can store the items for the first order and the second order. The operations may also include generating assignment data identifying an assignment of the batched order to a delivery vehicle, and transmitting the assignment data to another computing device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 4A illustrates a state diagram of a scheduled delivery of a batch order in accordance with some embodiments;

FIG. 4B illustrates example scenarios of the state diagram of FIG. 4A in accordance with some embodiments;

FIG. 5B illustrates a diagram of acceptances to the delivery vehicle timeslot requests of FIG. 5A in accordance with some embodiments;

DETAILED DESCRIPTION

Figure 1:
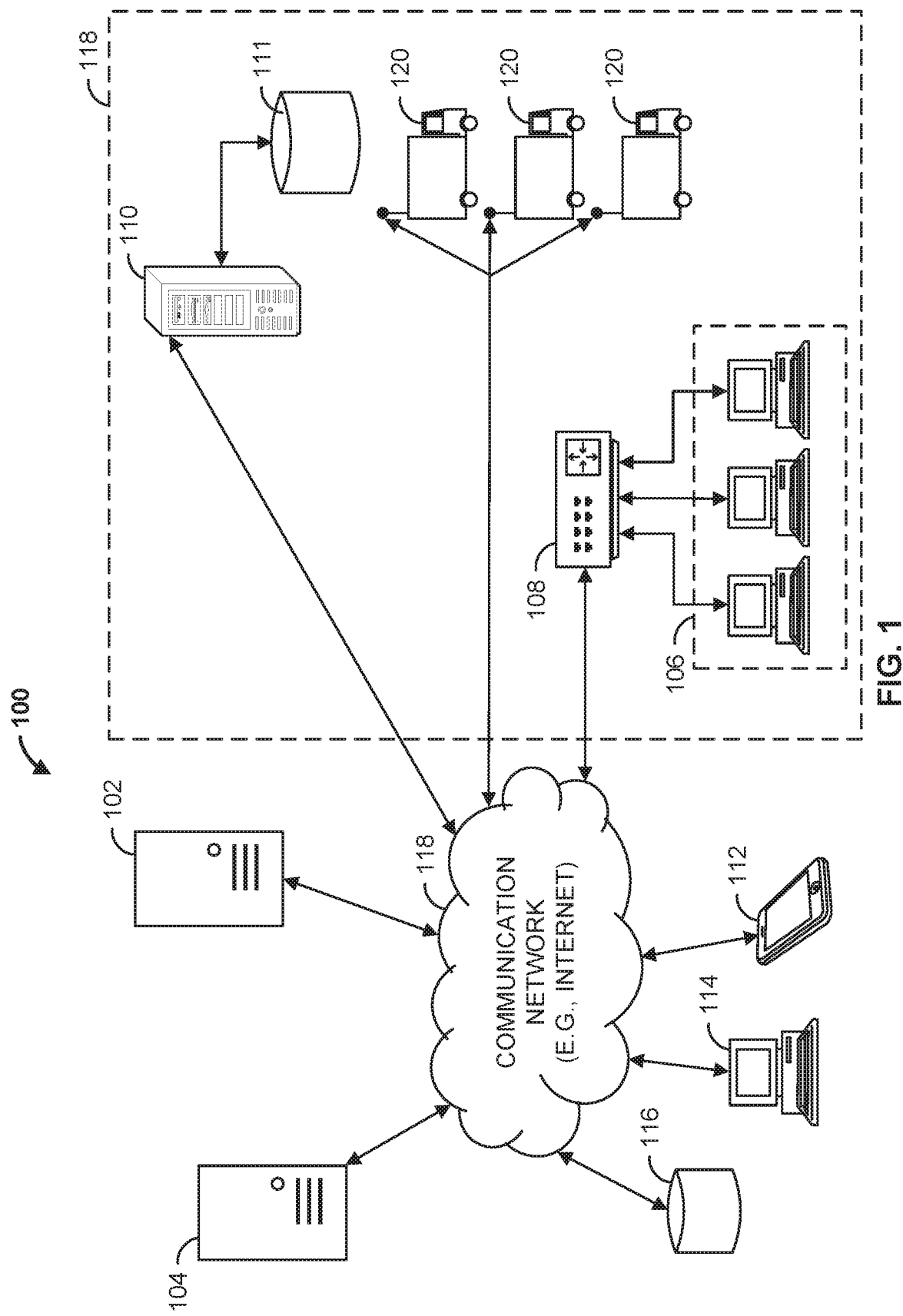
FIG. 1 is a block diagram of a delivery management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a delivery management system 100 that includes a delivery management computing device 102 (e.g., a server, such as an application server), a web hosting device 104 (e.g., a web server), workstation(s) 106, database 116, scheduling server 110, and multiple customer computing devices 112, 114 operatively coupled over network 118. Delivery management system 100 may also include one or more delivery vehicles 120, which may be operated by delivery personnel. The delivery personnel may operate a computing device. Delivery management computing device 102, web hosting device 104, workstation(s) 106, scheduling server 110, and multiple customer computing devices 112, 114 can each be any suitable computing device that includes any hardware or hardware and software combination for processing and handling information. In addition, each can transmit data to, and receive data from, communication network 118.

For example, each of delivery management computing device 102, web hosting device 104, workstation(s) 106, scheduling server 110, and multiple customer computing devices 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates two customer computing devices 112, 114, delivery management system 100 can include any number of customer computing devices 112, 114. Similarly, delivery management system 100 can include any number of workstation(s) 106, 108, scheduling servers 110, delivery management computing devices 102, delivery vehicles 120, web hosting devices 104, and databases 116.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Delivery management computing device 102, web hosting device 104, workstation(s) 106, 108, and scheduling server 110 may be operated by a retailer. Customer computing devices 112, 114 may be computing devices operated by customers of a retailer. In some examples, web hosting device 104 hosts one or more web pages for the retailer. Each customer computing device 112, 114 may be operable to access the one or more webpages hosted by web hosting device 104 over communication network 118. For example, a customer operating a customer computing device 112, 114 may view a retailer's website hosted by web hosting device 104 as displayed by the customer computing device 112, 114, and may purchase products, such as goods or services, from the retailer's website by interacting with the website via the customer computing device 112, 114. The customer may also be able to request that the order be delivered. In some examples, scheduling server 110 is operable to schedule the orders for delivery with delivery vehicles 120. For example, upon receiving a request for the delivery of an order, scheduling server 110 may schedule the order to be delivered by a delivery associate operating delivery vehicle 120. The delivery associate may receive the request via a computing device, such as a mobile device. Scheduling server 110 is communicatively coupled to database 111, which may store scheduling data identifying the scheduled orders.

Workstation(s) 106, 108 may be operably coupled to communication network 118 via a router (or switch) 108. As such, workstation(s) 106, 108 can communicate with delivery management computing device 102 over communication network 118. For example, workstations(s) 106, 108 may transmit data, such as purchase order data, to delivery management computing device 102. Similarly, workstation (s) 106, 108 may receive data from delivery management computing device 102. Workstation(s) 106, 108 along with router 108 may be located at a retail location 118, such as a store or warehouse where purchased items are stored. Scheduling server 110 may also be located at retail location 118, and may schedule orders for delivery to be delivered from retail location 118 by delivery associates operating delivery vehicles 120.

Delivery management computing device 102 is operable to communicate with database 116 over communication network 118. For example, delivery management computing device 102 can store data to, and read data from, database 116. Database 116 may be a tangible, non-transitory memory. For example, database 116 may be a remote storage device, such as a cloud-based server, a memory device on another application server, a networked computer, or any other suitable remote storage. Although shown remote to delivery management computing device 102, in some examples, database 116 can be a local storage device, such as a hard drive, a non-volatile memory, or a USB stick. Database 116 may store purchase order data. For example, a customer may purchase good from a retailer's website hosted by web hosting device 104. Web hosting device 104 may store purchase order data identifying and characterizing the order in database 116. Delivery management computing device 102 may then obtain the purchase order data from database 116.

Delivery management computing device 102 may batch (e.g., combine, group) orders for delivery using a same delivery vehicle. For example, delivery management computing device 102 may obtain purchase order data from database 116, determine whether two or more of the orders may be scheduled to be delivered by the same delivery vehicle, and schedule the batched orders for delivery. The batched orders may be transmitted to scheduling server 110, which may then schedule the orders with delivery vehicle 120. Delivery personnel operating delivery vehicle 120 may proceed to pick up the purchased goods for each order of the batched orders from retail location 118, place the purchased items for the batched orders in delivery vehicle 120, and proceed to deliver the purchased good in accordance with the batched order scheduling.

In some examples, delivery management computing device 102 considers vehicle capacities for each delivery vehicle 120 to determine whether orders may be batched. For example, database 116 may store data identifying the available space for storing goods in each delivery vehicle 120, such as an available volume of space. Based on the available space, delivery management computing device 120 may determine whether two or more orders may be batched for delivery. In some examples, delivery management computing device 102 considers driver availability, requested delivery times, and customer addresses. Delivery management computing device 102 may batch orders together within a same delivery time window, and they may be sequenced in a particular order to be delivered by a same delivery vehicle 120.

In some examples, delivery management computing device 102 may determine an arrival time for the driver of delivery vehicle 120 to pick up the purchased goods from a retail location 118, an arrival time for the delivery of each of a plurality of orders, and a second arrival time back at the retail location 118, for example, to pick up additional orders or return undelivered items. Delivery management computing device 102 may determine each arrival time at a delivery address based on a loading time, a travel time, and a doorstep time. The loading time includes the amount of time to pick up the purchased goods from retail location 118 and load them onto delivery vehicle 120. The travel time includes the travel time from a previous location to a delivery destination. For example, the travel time for a first delivery may include the travel time from retail location 118 to the delivery address of the first delivery. The travel time for a second delivery may include the travel time from the delivery address of the first delivery to the delivery address of the second delivery. The doorstep time includes a time difference between when the driver of delivery vehicle 120 leaves the delivery vehicle 120, after arriving at a delivery destination, to deliver and order, and when the driver re-enters delivery vehicle 120. Delivery management computing device 102 may update one or more of a travel time, doorstep time, and a loading time in real time. For example, delivery management computing device 102 may increase a travel time based on increasing traffic, or worsening weather.

In some examples, delivery management computing device 102 determines whether any item delivered should be temperature controlled, such as meat or ice cream, and assures that the estimated delivery time for the order including that item is not more than a maximum amount of time, such as one hour. For example, delivery management computing device 102 may schedule an order that includes an item that should be temperature controlled as the first delivery of a batched order.

In some examples, scheduling server 110 transmits a batch order request to the computing device of a driver of delivery vehicle 120. The batch order request may include a delivery price (e.g., surge price) to be paid to the driver. The batch order request may be transmitted to the computing device of the driver of delivery vehicle 120 via scheduling server 120, for example. In some examples, the batch order request includes the delivery address for each order, the contents of each order, and an order of delivery for each order.

The driver of delivery vehicle 120 may accept or reject a batch order request. If a batch order request is rejected, by a first delivery vehicle 120, delivery management computing device 102 may transmit the request to a second delivery vehicle 120. If no delivery vehicles 102 accept the request, delivery management computing device 102 may transmit a request for delivery of the batched order request to a third-party, such as a delivery company.

Assuming a delivery vehicle 120 accepts the request, delivery management computing device 102 may notify scheduling server 110 when delivery vehicle 120 arrives at retail location 118 to pick up the purchased goods for delivery of the batched order. Delivery management computing device 102 is operable to track the location of delivery vehicle 120 using any suitable tracking technology, such as the Global Positioning System (GPS). For example, delivery vehicle 120, or the computing device operated by the driver of delivery vehicle 120, may be GPS enabled.

Delivery management computing device 102 may maintain status for each delivery vehicle 120, which may be stored in database 116. For example, upon receiving an acceptance of a batch order request, delivery management computing device 102 may generate a status of "accepted" for each order (i.e., delivery) of the batch order. Upon delivery vehicle 120 picking up the batched orders at retail location 118, delivery management computing device 102 may change the status for each delivery of the batch order to "picked up." Once delivery vehicle 120 begins to leave retail location 118 to deliver the first order, delivery management computing device 102 may change the status of the first order to "enroute" or "enroute to dropoff" In some examples, delivery management computing device 102 generates a communication, such as an email or SMS (e.g., text message) to the customer (via, e.g., customer computing device 112, 114). The communication may include an indication that the delivery vehicle 120 is enroute to deliver the first order. In some examples, the communication includes an estimated arrival time for the first order (e.g., a tracking email).

Once delivery vehicle 120 arrives at the delivery address for the first order, delivery management computing device 102 may change the status of the first order to "at customer location." If the driver is able to deliver the purchased goods, the drive may so indicate via the computing device. Upon receiving an indication that the purchased goods were delivered, delivery management computing device 102 may change the status of the first order to "delivered." If, however, the purchases goods were not delivered (e.g., customer was not home, or customer rejected one or more of the items for delivery), delivery management computing device 102 may change the status of the first order to "rejected." The driver may then move on to deliver the next order of the batched order. In some examples, delivery management computing device 102 generates a communication to the customer indicating a delivery attempt was made and, in some examples, provides an option to reschedule the delivery.

In some examples, if an order is rejected, delivery management computing device 102 may edit the delivery sequence of delivery vehicle 120 to indicate that delivery vehicle 120 is to return to retail location 118 to return the items. In some examples, delivery management computing device 102 adds the retail location 118 to the end of a current batch order delivery. In some examples, if the driver would not have enough time to complete all orders and arrive back at retail location 118 before the driver's shift is complete, delivery management computing device 102 may remove one or more deliveries of the batch order from the driver, and adds the retail location 118 as the final stop for that delivery vehicle 120. In this case, delivery management computing device 102 may re-schedule any removed orders with another delivery vehicle 120.

Figure 2:
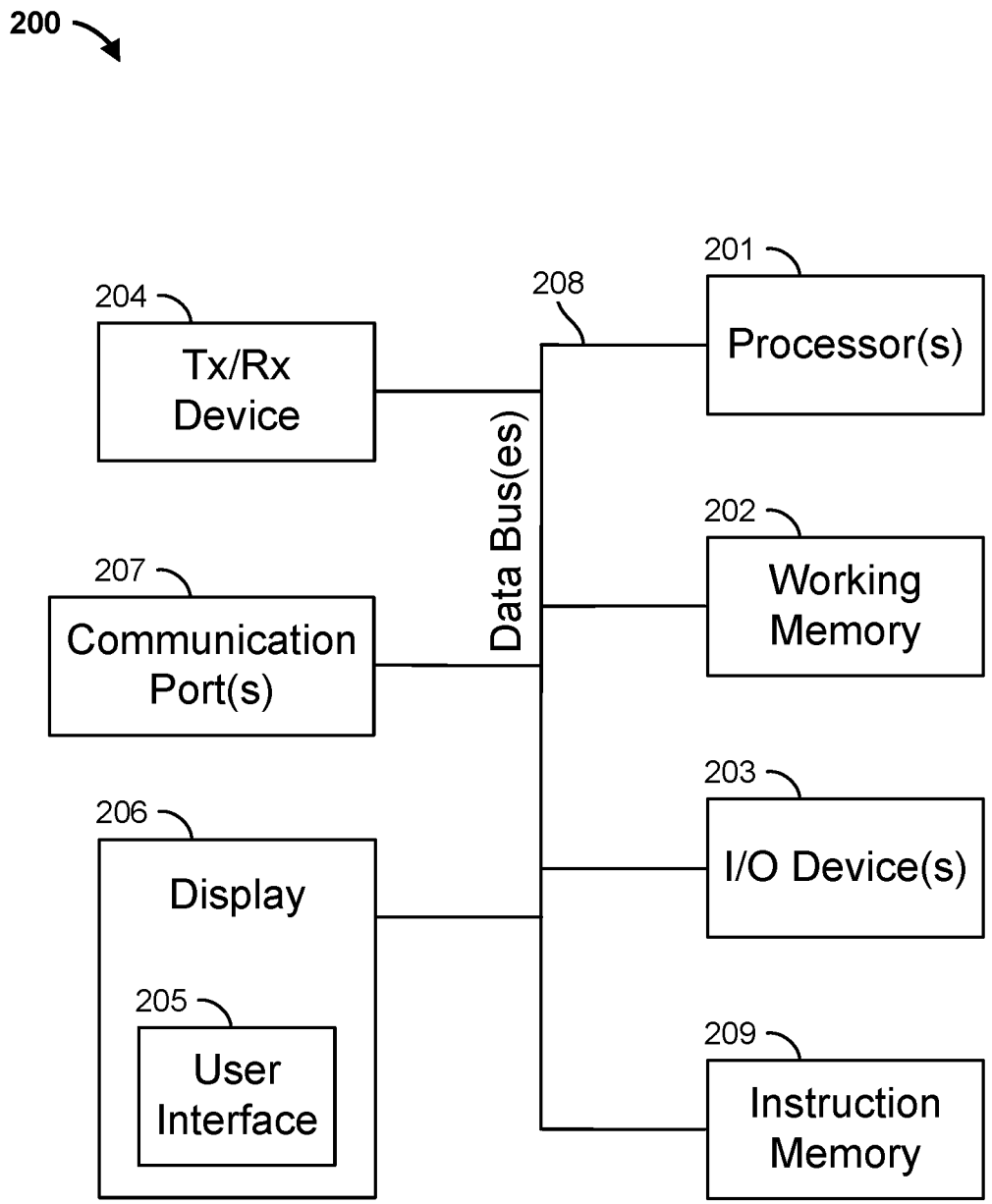
FIG. 2 is a block diagram of the delivery management computing device of FIG. 1 in accordance with some embodiments.

FIG. 2 illustrates the delivery management computing device 200 of FIG. 1. Delivery management computing device 102 (e.g., delivery management computing device 200) can include one or more processors 201, working memory 202, one or more input/output devices 203, instruction memory 209, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 209, embodying the function or operation. For example, processors 201 can be configured to perform one or more of any function, method, or operation disclosed herein.

Instruction memory 209 can store instructions that can be accessed (e.g., read) and executed by processors 201. For example, instruction memory 209 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 2097. Processors 201 can also use working memory 202 to store dynamic data created during the operation of delivery management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as scheduling data.

Display 206 can display user interface 205. User interfaces 205 can enable user interaction with delivery management computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 delivery management computing device 102 will be operating in. Processor(s) 201 is operable to receive data from, or send data to, a network, such as communication network 118 of FIG. 1, via transceiver 204.

Figure 3:
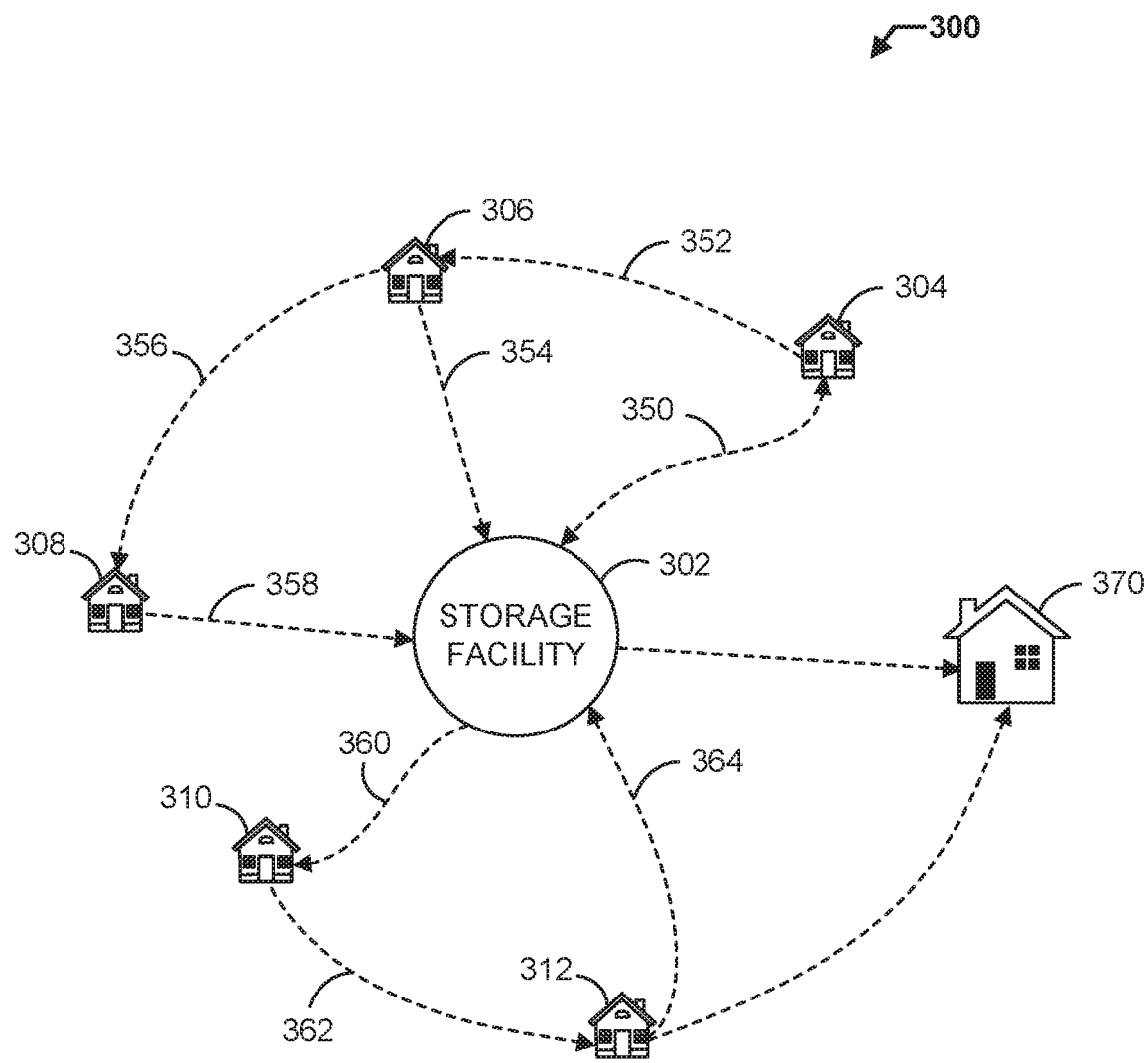
FIG. 3 illustrates an exemplary route map for one or more delivery vehicles employed in the delivery management system of FIG. 1 in accordance with some embodiments.

FIG. 3 illustrates a route map 300 representing delivery routes that may be generated by delivery management computing device 102 for one or more delivery vehicles 120. Route map 300 includes storage facility 302, which may be a retail location or warehouse where goods for delivery are stored, as well as customer locations 304, 306, 308, 310, 312. Route map 300 also illustrates driver home location 370, which may be a residence of a driver of a delivery vehicle 120.

Delivery management computing device 102 may schedule a delivery vehicle 120 to deliver a batched order, which includes delivery of purchased goods to a plurality of delivery locations. For example, delivery management computing device 102 may transmit a batch delivery request to a delivery vehicle 120 for delivery of one or more batched orders within a particular time slot (e.g., time window, such as a 2 or 3 hour time window). Assuming delivery vehicle 120 accepts the request, delivery management computing device 102 may schedule delivery vehicle 120 to arrive at storage facility 302 at the beginning of the time slot.

Delivery management computing device 102 may determine which orders may be batched for delivery within the time slot. For example, delivery management computing device 102 may determine a travel time along route 350 from storage facility 302 to customer location 304. Delivery management computing device 102 may also determine an arrival time at customer location 304 based on a loading time at storage facility 302 to load the items for the batched orders, the travel time from storage facility 302 to customer location 304 along route 350, and a doorstep time at customer location 304 to deliver the purchased items for that delivery. The doorstep time may be estimated based on, for example, historical data, such as the average of previously known doorstep times over a given time period.

To determine, for example, whether the order to be delivered at customer location 306 may be batched with the order for delivery at customer location 304, delivery management computing device 102 determines whether the order may be delivered within the scheduled time slot. For example, delivery management computing device 102 may add the determined arrival time at customer location 304, a travel time from customer location 304 to customer location 306 along route 352, and the doorstep time at customer location 306, to determine the arrival time at customer location 306. If the arrival time at customer location 306 is within the scheduled time slot, delivery management computing device 102 may batch the orders for delivery at customer locations 304, 306. Similarly, delivery management computing device 102 may add the determined arrival time at customer location 306, a travel time from customer location 306 to customer location 308 along route 356, and the doorstep time at customer location 308, to determine the arrival time at customer location 306.

In some examples, if delivery vehicle 120 is to return to storage facility 302, delivery management computing device 102 considers whether delivery vehicle 120 has time to return to storage facility 302 within the time slot. For example, delivery management computing device 102 may add the travel time from customer location 306 to storage facility 302 along route 354 to the arrival time at customer location 306. If delivery management computing device 102 determines that delivery vehicle 120 is able to return to storage facility 302 within the time slot, delivery management computing device 102 batches the orders for delivery to customer locations 304, 306, and also schedules a return to storage facility 302.

Similarly, delivery management computing device 102 may determine whether the orders for delivery at customer location 304, customer location 306, and customer location 308 may be batched. For example, delivery management computing device 102 may determine the travel time from customer location 306 to customer location 308, and the doorstep time at customer location 308. Delivery management computing device 102 may then add the travel time, and the doorstep time at customer location 308, to the arrival time at customer location 306. Delivery management computing device 102 may then determine if the orders for customer locations 304, 306, 308 can be delivered within the scheduled time slot. If so, delivery management computing device 102 may batch the orders for delivery to customer locations 304, 306, 308.

In some examples, delivery computing device may determine that delivery vehicle 120 cannot store more than the orders for delivery at customer locations 304, 306, 308. For example, delivery vehicle 120 may not have the capacity to carry any more items. As such, delivery management computing device 102 may schedule delivery vehicle 120 to return to storage facility 302 along route 358 to pick up additional orders. If delivery vehicle 120 is to return to storage facility 302, delivery management computing device 102 may determine the arrival time at storage facility 302 by adding the arrival time at customer location 308 to a determined travel time from customer location 308 to storage facility 302 along route 358.

Delivery management computing device 102 may determine how many additional orders may be batched for delivery by delivery vehicle 120 within the scheduled time slot. For example, delivery management computing device 102 may determine an arrival time at customer location 310 from storage facility 302 based on a loading time at storage facility 302 to load new orders, and a travel time from storage facility 302 to customer location 310 along route 360. Delivery management computing device 102 may also determine an arrival time at customer location 312 based on travel time for travelling along route 362 from customer location 310 to customer location 312, and a doorstep time for customer location 312. If the orders may be delivered to customer locations 310, 312 within the time slot, delivery management computing device 102 may batch the orders. If delivery vehicle is to return to storage facility 302, delivery management computing device 102 may also determine the travel time from customer location 312 to storage facility 302 along route 364.

In some examples, delivery management computing device 102 allows for time within the delivery time slot for the driver of delivery vehicle 120 to return home to driver home location 370. For example, in determining whether orders may be batched, delivery management computing device 102 adds the time it takes to travel from either a last delivery location, such as customer location 312, to driver home location 370, or from storage facility 302 to driver home location 370, depending on where the last location of delivery vehicle 120 before proceeding to driver home location 370. If delivery management computing device 102 determines that the delivery vehicle 120 will reach driver home location 370 within the scheduled time slot, delivery management computing device 102 may batch orders; otherwise, if delivery management computing device 102 determines that the delivery vehicle 120 will not reach driver home location 370 within the scheduled time slot, the orders being considered are not batched. Instead, for example, delivery management computing device 102 may determine whether a smaller number of orders may be batched. In some examples, the travel time to driver home location 370 is not considered.

FIG. 4A illustrates a state diagram 400 of a scheduled batch order for delivery that, for example, may be generated and maintained by delivery management computing device 102. In this example, the batch order includes two orders, each of which maintains a corresponding state. Beginning at block 402, a delivery vehicle, such as delivery vehicle 120, is enroute to pick up items for each of the orders. For example, delivery vehicle 120 may be on the way to storage facility 302 to pick up purchased goods for each of two orders of a batched order. The state for each order is set to "enroute to pick up," for example. At block 404, the delivery vehicle arrives at the pickup location. The state for each order may then be set to "at pickup location." At block 406, the items for each of the order have been picked up. For example, the driver of delivery vehicle 120 has loaded the items into delivery vehicle 120. The state for each order may then be changed to "order picked up."

Based on the sequencing of the orders, the delivery vehicle may proceed to deliver the first order, or the second order. Assuming the delivery vehicle is scheduled to deliver the first order first, at block 408 the status of the first order is changed to "enroute to drop off" while the status of the second order remains at "order picked up." Otherwise, if the second order is scheduled to be delivered first, at block 418 the status of the second order is changed to "enroute to drop off" while the status of the first order would remain at "order picked up."

Back at block 408, the delivery vehicle is enroute to deliver the items of the first order. In some examples, the delivery vehicle may abandon and skip the delivery at block 416. The status of the first order is changed to "skip order"

and, at block 418, the status of the second order is changed to "enroute to drop off." The first order may be skipped, for example, if the customer indicates no one will be home to accept the items of the first order. For example, the customer may place a call to customer service indicating that no one will be home. In response, customer service personnel may cause delivery management computing device 102 to transmit skip data indicating that the current delivery should be skipped to the delivery vehicle. In some examples, the first order may be skipped if traffic or weather is significantly delaying the delivery of the first order.

Otherwise, assuming the delivery of the first order is not skipped, at block 410 the status of the first order changes to "at customer location" once the delivery vehicle arrives at the delivery address for the first order, while the status of the second order remains at "order picked up." If the driver of the delivery vehicle is able to deliver the items of the first order to the customer, at block 412 the status of the first order is changed to "delivered" and, at block 418, the status of the second order is changed to "enroute to drop off."

Otherwise, if the items of the first order are not delivered to the customer, at block 414 the status of the first order is changed to "rejected." The items of the first order may not be delivered if, for example, the customer is not available, or the customer rejects the items. In some examples, if the customer rejects one or more items, the delivery vehicle may transmit (e.g., the driver of the delivery vehicle may cause a computing device, such as a mobile phone, to transmit) rejection data to delivery management computing device 102 (or scheduling server 110) indicating that the first order was rejected. In response to receiving the rejection data, delivery management computing device 102 (or scheduling server 110) may transmit to the delivery vehicle adjustment data indicating that the delivery vehicle 120 is to return the rejected items to a storage facility. For example, rather than proceeding to deliver the second order, the delivery vehicle may proceed back to the pickup location to return the rejection items where, at block 426, the status of the first order is changed to "enroute to return."

Likewise, if, at block 414, delivery of the second order has already been attempted, the delivery vehicle proceeds back to the pickup location to return rejected items where, at block 426, the status of the first order is changed to "enroute to return." If, however, delivery of the second order has not yet been attempted, the delivery vehicle may proceed to deliver the second order at block 418, where the status of the second order is changed to "enroute to drop off."

Once the delivery vehicle arrives at the delivery address for the second order, the status of the second order is changed to "at customer location." If the driver of the delivery vehicle is able to deliver the items of the second order to the customer, at block 422 the status of the second order is changed to "delivered." If both the first order has been delivered, the delivery of the batched order is complete. If, however, the first order has not been delivered, at block 408 the status of the first order is changed to "enroute to drop off," as the delivery vehicle proceeds to the delivery address of the first order.

Back at block 420, if the items of the second order are not delivered to the customer, at block 424 the status of the second order is changed to "rejected." If the items of the first order have not yet been delivered and have not yet been rejected, the delivery vehicle proceeds to deliver the items of the first order, and the status of the first order changes to "enroute to drop off." Otherwise, if the items of the first order have been delivered, the delivery vehicle proceeds back to the pickup location (e.g., storage facility 302) to return the items and the status of the second order is changed to "enroute to return" at block 426. In addition, if the items of the first order were rejected, the status of the first order is also changed to "enroute to return" at block 426. Once the delivery vehicle arrives at the pickup location, the status of any order for which items are being returned is changed to "returned" at block 428.

FIG. 4B illustrates example initial states 470, 472 and next states 474, 476 for the first and second orders of the batched order. For example, if the current status of the first order is "enroute to dropoff" and a decision to skip is made, the next status of the first order will be "skipped." Similarly, if a current status of the second order is "picked up," the next status of the second order is "enroute to drop off" once the delivery vehicle is on the way to deliver the second order. Additional initial 470, 472 and next 474, 476 states for the first and second orders are illustrated.

Figure 5A:
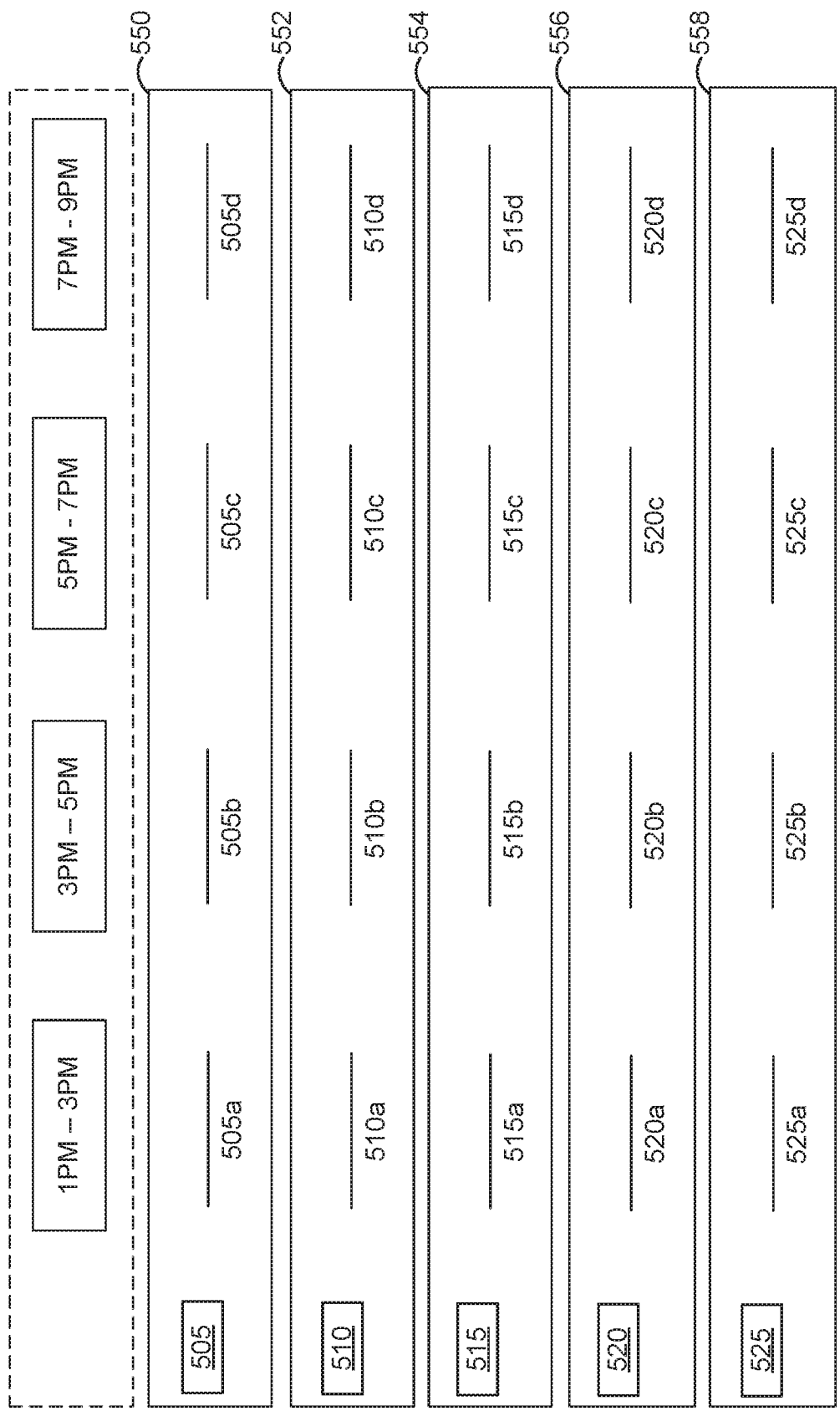
FIG. 5A illustrates a diagram of delivery vehicle timeslot requests in accordance with some embodiments.

FIG. 5A illustrates a plurality of delivery vehicle timeslot requests 550, 552, 554, 556, 558 which may be transmitted by delivery management computing device 102 to a computing device of drivers of corresponding delivery vehicles 505, 510, 515, 520, 525. Each delivery vehicle timeslot request 550, 552, 554, 556, 558 may be displayed, for example, by a display of the computing device. In this example, each delivery vehicle timeslot request 550, 552, 554, 556, 558 includes a number of timeslots that a driver may accept as being available to deliver orders, such as batched orders. For example, delivery vehicle timeslot request 550 includes timeslots 505a-505d. Timeslot request 505a is a request for delivery availability between the hours of 1 pm and 3 pm. Timeslot request 505b is a request for delivery availability between the hours of 3 pm and 5 pm, timeslot request 505c is a request for delivery availability between the hours of 5 pm and 7 pm, and timeslot request 505d is a request for delivery availability between the hours of 7 pm and 9 pm. Likewise, delivery vehicle timeslot request 552 includes timeslots 510a-510d, vehicle timeslot request 554 includes timeslots 515a-515d, vehicle timeslot request 556 includes timeslots 520a-520d, and vehicle timeslot request 558 includes timeslots 525a-525d.

Delivery vehicle timeslot requests 550, 552, 554, 556, 558 may be transmitted to delivery vehicles 505, 510, 515, 520, 525 consecutively. In some examples, one vehicle timeslot request 550, 552, 554, 556, 558 is transmitted to a corresponding delivery vehicle. Upon receiving a response or, in some examples, upon the expiration of a maximum amount of time (e.g., 15 minutes, an hour), a different vehicle timeslot request 550, 552, 554, 556, 558 may be transmitted to its corresponding delivery vehicle. Upon receiving a delivery vehicle timeslot request 550, 552, 554, 556, 558, a driver may accept (e.g., via the receiving computing device) one or more timeslots. The selection of a timeslot indicates that the delivery vehicle is available for deliveries during the corresponding timeslot.

For example, the driver of vehicle 505 may, upon receiving vehicle timeslot request 550, select one or more timeslots 505a-505d to indicate availability for deliveries during the selected timeslots. As illustrated in FIG. 5B, timeslot 505a has been selected for delivery vehicle 505. In this example, timeslot 510a for vehicle timeslot request 552 is not available, while timeslots 510b-510d are available. Timeslot 510a may not be available because, in some examples, the timeslot was already assigned to delivery vehicle 505. As illustrated, timeslots 510b and 510c have been selected.

Vehicle timeslot request 554 includes timeslots 515a and 515c with no availability (i.e., the timeslots may not be accepted) and timeslots 515b and 515d with availability. In this example, the driver of delivery vehicle 515 does not select any available timeslots. This may be, for example, because the driver is not available to make deliveries during the only available timeslots.

Vehicle timeslot request 556 is transmitted to delivery vehicle 520 and includes timeslots 520a and 520c with no availability and timeslots 520b and 520d with availability. For example, vehicle timeslot request 556 may have been transmitted to delivery vehicle 520 because at least one timeslot 515a and 515c of vehicle timeslot request 554 were not selected. The driver of delivery vehicle 520, in this example, selects timeslot 520d, but does not select timeslot 520b. In some examples, although timeslot 505a for vehicle timeslot request 550 was selected, additional orders for delivery may have been received thereby requiring another driver during that same timeslot. Thus, vehicle timeslot request 556 is transmitted with available timeslots 525a and 525b, but not availability during timeslots 525c and 525d. The driver for delivery vehicle 525 selects timeslots 525a and 525b. Upon selection of timeslots (via, e.g., a touchscreen display of the computing device), the computing device may transmit, to delivery management computing device 102, the selection of timeslots, as described further below.

Figure 6A:
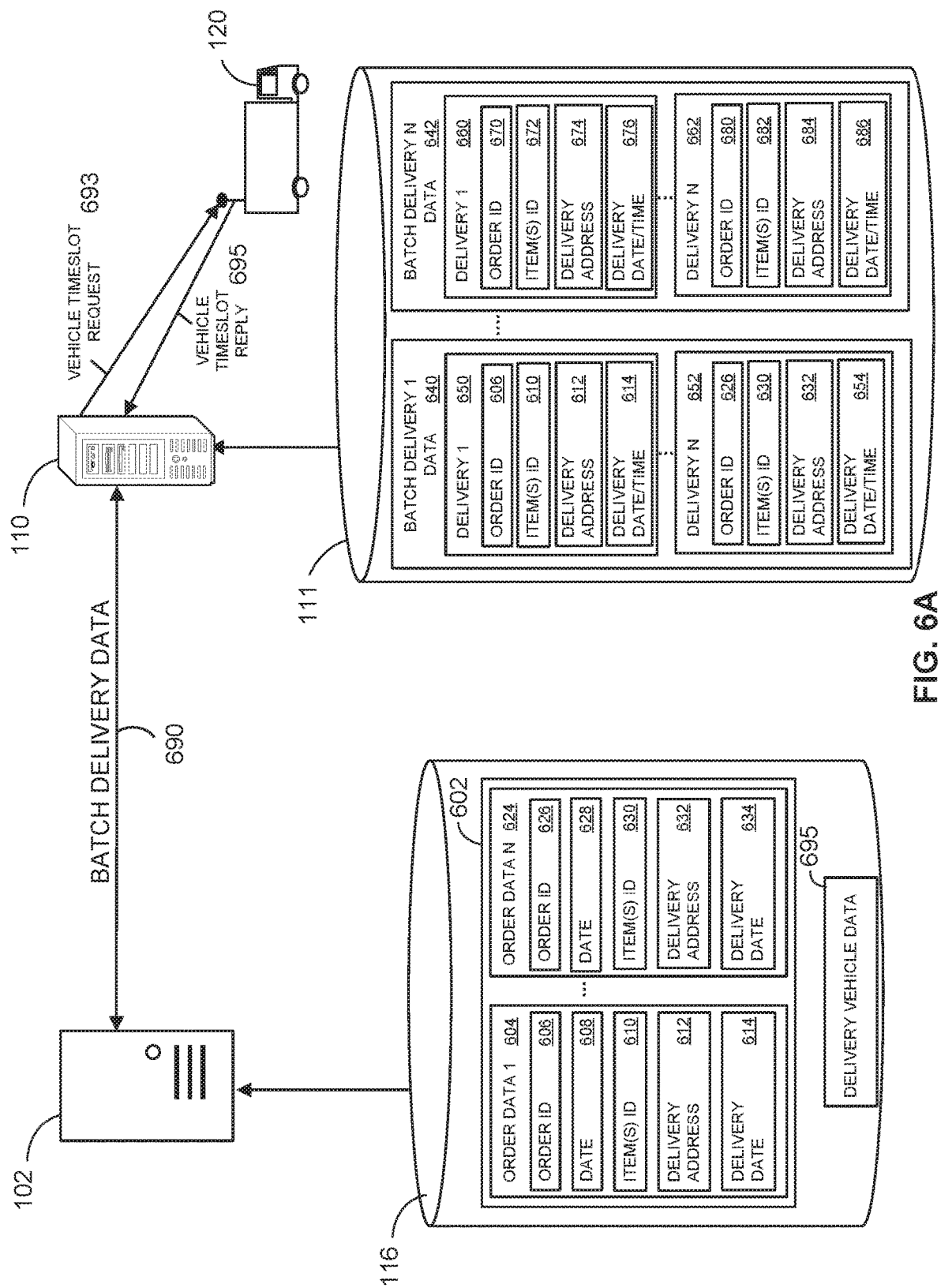
FIG. 6A is a block diagram of various portions of the delivery management system of FIG. 1 illustrating the batching of orders in accordance with some embodiments.

FIG. 6A is a block diagram of various portions of delivery management system 100 including delivery management computing device 102, scheduling sever 110, delivery vehicle 120, and database 116. As noted above, delivery management computing device 102 batch orders and schedule the orders for delivery. Delivery management computing device 102 may batch orders identified by order data 602 stored in database 116. Order data 602 may be stored in database 116 by, for example, web server 104 for online orders, and by workstation(s) 106 for in-store orders.

As illustrated, order data 602 may include data identifying a first order 604 up to a $N^{th}$ order 624. First order 604 may include an order ID 606, which may identify the order. First order 604 may also include a date 608, which may be the date the order was placed, and one or more item IDs 610, where each item ID 610 identifies an ordered item. In some examples, item IDs 610 are stock keeping unit (SKU) numbers. First order 604 may also include a delivery address 612 identifying the delivery address for first order 604, and a delivery date/time 614 identifying a date and/or time of delivery for first order 604. Similarly, $N^{th}$ order 624 may include one or more of order ID 626, date 628, item(s) ID 630, delivery address 632, and delivery date/time 634.

Delivery management computing device 102 may determine if one or more orders, such as the orders identified by first order data 604 and $N^{th}$ order data 624, may be batched for delivery. For example, delivery management computing device 102 may determine if a delivery vehicle has enough time to leave from a storage facility where the ordered items are stored, proceed to delivery address 612 to deliver the items identified by first order data 604, and to proceed to delivery address 632 to deliver the items identified by first order data 624 within a time window. The time window may be based on a delivery timeslot (e.g., 2 hours for a timeslot of 1 pm to 3 pm) that corresponds to a selected time for delivery of the orders identified by delivery date/time 614, 634. If the orders may be delivered within the time window, the orders may be batched.

In some examples, delivery management computing device 102 may, additionally or alternatively, determine whether delivery vehicle 120 may store the items for both orders. For example, delivery management computing device 102 may determine whether a total available storage (e.g., cargo) space of delivery management computing device 120, as identified by delivery vehicle data 695, is large enough to accommodate the items for both orders. If delivery vehicle 120 has enough storage space, the orders may be batched.

In some examples, delivery management computing device 102 may, additionally or alternatively, determine whether one or more of the orders includes a temperature sensitive item. If one of the orders includes a temperature sensitive item, delivery management computing device 102 may determine whether the order pertaining to the temperature sensitive item may be delivered within a time window (e.g., 15 minutes, one hour) after leaving the storage facility if the orders are batched. If the order may be delivered within the time window, the orders may be batched.

Delivery management computing device 102 transmits batch delivery data 690, identifying one or more batched orders, to scheduling server 110. Scheduling server 110 may be parse and format batch delivery data 690 for storage to database 111. For example, for each batched order, batch delivery data 690 may identify order IDs, item(s) IDs, and a delivery address. In this example, scheduling server 110 may receive batch delivery data 690 identifying a batched order that includes the orders identified by first order data 604 and $N^{th}$ order data 624. Scheduling server 110 may process batch delivery data 690 to generate first batch delivery data 640 which may then be stored in database 111. First batch delivery data 640 may identify a first delivery 650 for order ID 606, and a $N^{th}$ delivery 652 for order ID 626.

Scheduling server 110 may transmit a vehicle timeslot request 693 (e.g., vehicle timeslot request 550) to one or more delivery vehicles 120 requesting availability for deliveries during a delivery timeslot. The delivery timeslot based on the delivery date and/or time of the corresponding deliveries for first batch delivery data 640. For example, scheduling server 110 may determine a delivery timeslot that includes a delivery time for each of the orders. In some examples, delivery date/time 614 includes a range of times (e.g., 5-7 pm). Scheduling server 110 may determine a delivery timeslot that includes the range of time (e.g., 5-7 pm, 4-8 pm). In some examples, vehicle timeslot request 693 includes a delivery price, such as a price the driver of delivery vehicle 120 will be paid upon delivery of the corresponding orders. In response, delivery vehicle 120 may transmit a vehicle timeslot reply 695 accepting deliveries during the requested delivery timeslot. If the requested delivery timeslot is accepted, scheduling server 110 may transmit first batch delivery data 640 to the accepting delivery vehicle 120 for delivery of the corresponding orders.

Similarly, scheduling server 110 may receive and process batch delivery data 690 identifying the batching of a plurality of orders, to generate Nth batch delivery data 642. Nth batch delivery data 642 includes a first delivery 660 that identifies an order ID 670, item(s) ID 672, delivery address 674, and delivery date/time 676, up to a Nth delivery 662 that identifies an order ID 680, item(s) ID 682, delivery address 684, and delivery date/time 686. Scheduling server 110 may transmit a vehicle timeslot request 690 (e.g., vehicle timeslot request 550) to one or more delivery vehicles 120 requesting availability for deliveries during a delivery timeslot based on the delivery date and/or time of the corresponding deliveries for Nth batch delivery data 642. In response, delivery vehicle 120 may transmit a vehicle timeslot reply 695 accepting deliveries during the requested delivery timeslot. If the requested delivery timeslot is accepted, scheduling server 110 may transmit Nth batch delivery data 642 to the accepting delivery vehicle 120 for delivery of the corresponding orders.

In some examples, a batched order is unbatched. For example, an order may be unbatched if the delivery vehicle, when picking up the items for delivery at the storage location, cannot accommodate the items for the orders of a batched order. In some examples, an order may be unbatched if a travel time from the storage location to a delivery address, or from delivery address of one order to the delivery of another address of another order, changes. The travel time may change, for example, due to unexpected traffic, weather, special events, some other reason.

Figure 6B:
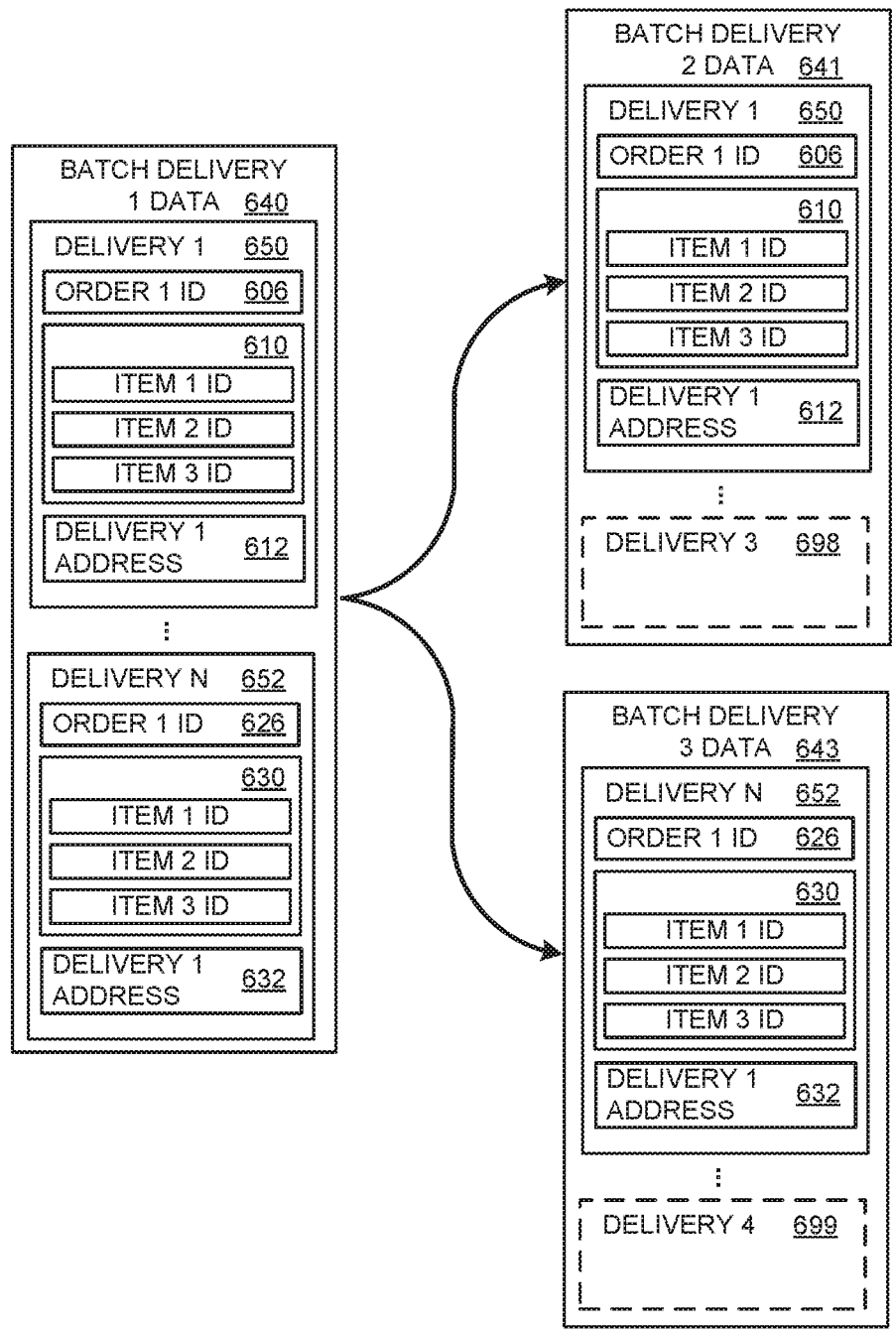
FIG. 6B is block diagram illustrating the un-batching of an order in accordance with some embodiments.

FIG. 6B illustrates the unbatching of first batch delivery data 640. In this example, scheduling sever 110 unbatches first batch delivery data 640, which includes first delivery 650 and Nth delivery 652, by assigning first delivery 650 to second batch delivery data 641 and Nth delivery 652 to third batch delivery data 643. As such, first delivery 650 may now be batched with one or more other deliveries, such as third delivery 698. A delivery vehicle 120 may be assigned to deliver the orders corresponding to second batch delivery data 641, which now includes first delivery 650. Similarly, Nth delivery 652 may be batched with one or more other deliveries, such as fourth delivery 699. A delivery vehicle 120 may be assigned to deliver the orders corresponding to third batch delivery data 643, which now includes Nth delivery 652.

Figure 7:
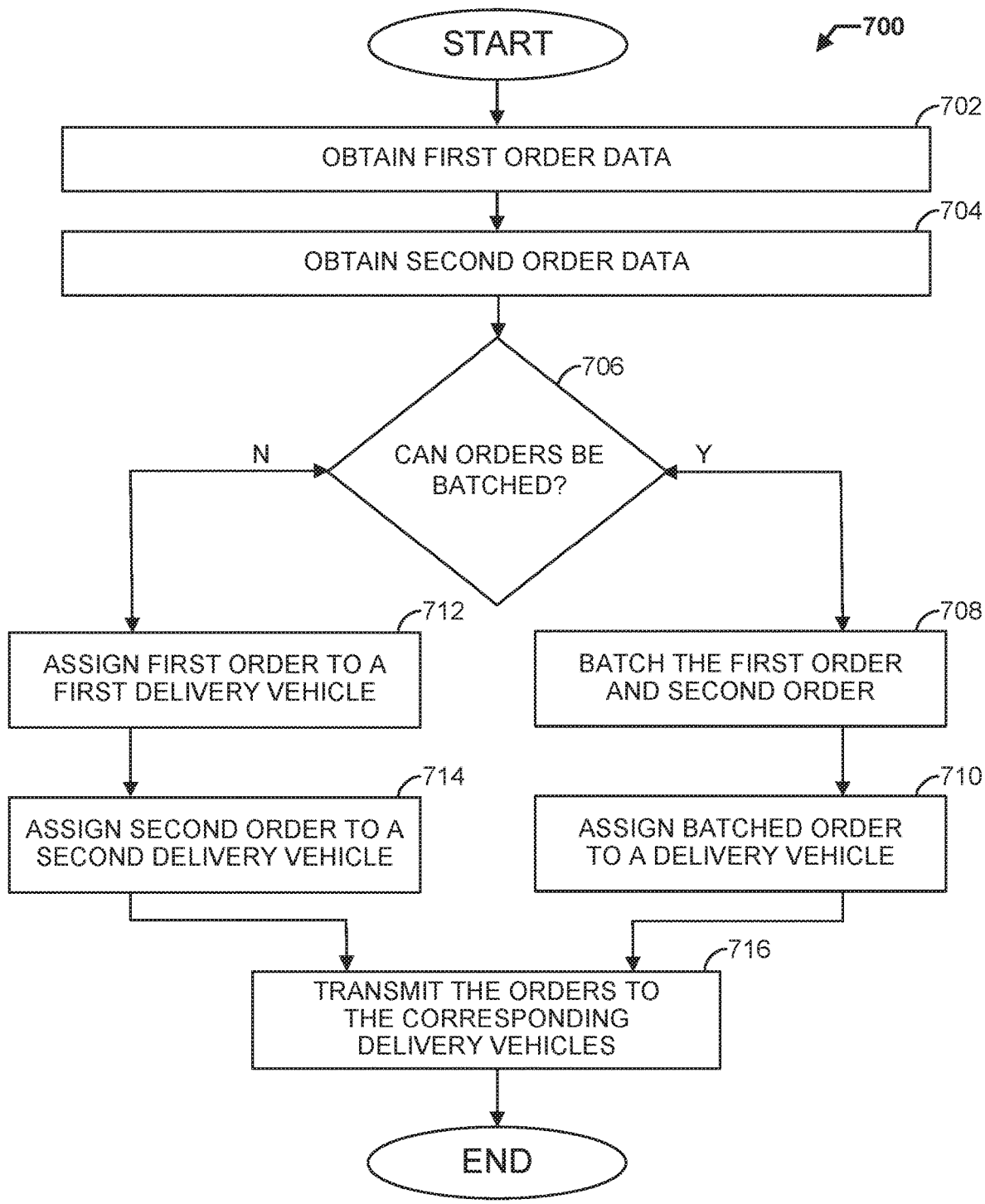
FIG. 7 is a flowchart of an example method that can be carried out by the delivery management computing device of FIG. 1 in accordance with some embodiments.

FIG. 7 is a flowchart of an example method 700 that can be carried out by, for example, the delivery management computing device 102 of FIG. 1. Beginning at step 702, first order data identifying an order for delivery, such data identifying first order data 604, is obtained. At step 704, second order data identifying a second order for delivery, such as $N^{th}$ order data 624, is obtained. At step 706, a determination is made as to whether the first order and second order can be batched. For example, the determination may be based on there being a sufficient amount of time to deliver the orders within a time window, or on whether a delivery vehicle can accommodate all of the items for each of the orders. If the orders can be batched, the method proceeds to step 708 where a batched order is generated. The method then proceeds to step 710, where the batched order, which includes the first order and the second order, is assigned to a delivery vehicle.

If, however, back at step 706 a determination is made that the orders cannot be batched, the method proceeds to step 712 where the first order is assigned to a first delivery vehicle. The method then proceeds to step 714, where the second order is assigned to a second delivery vehicle. From either step 714 or step 710, the method proceeds to step 716, where the orders are transmitted to the corresponding delivery vehicles. For example, if the orders were not batched, the first order is transmitted to the first delivery vehicle, and the second order is transmitted to the second delivery vehicle. If, however, the orders were batched, the batched order is transmitted to the delivery vehicle that is to deliver the batched order that includes the first and second orders. The method then ends.

Figure 8:
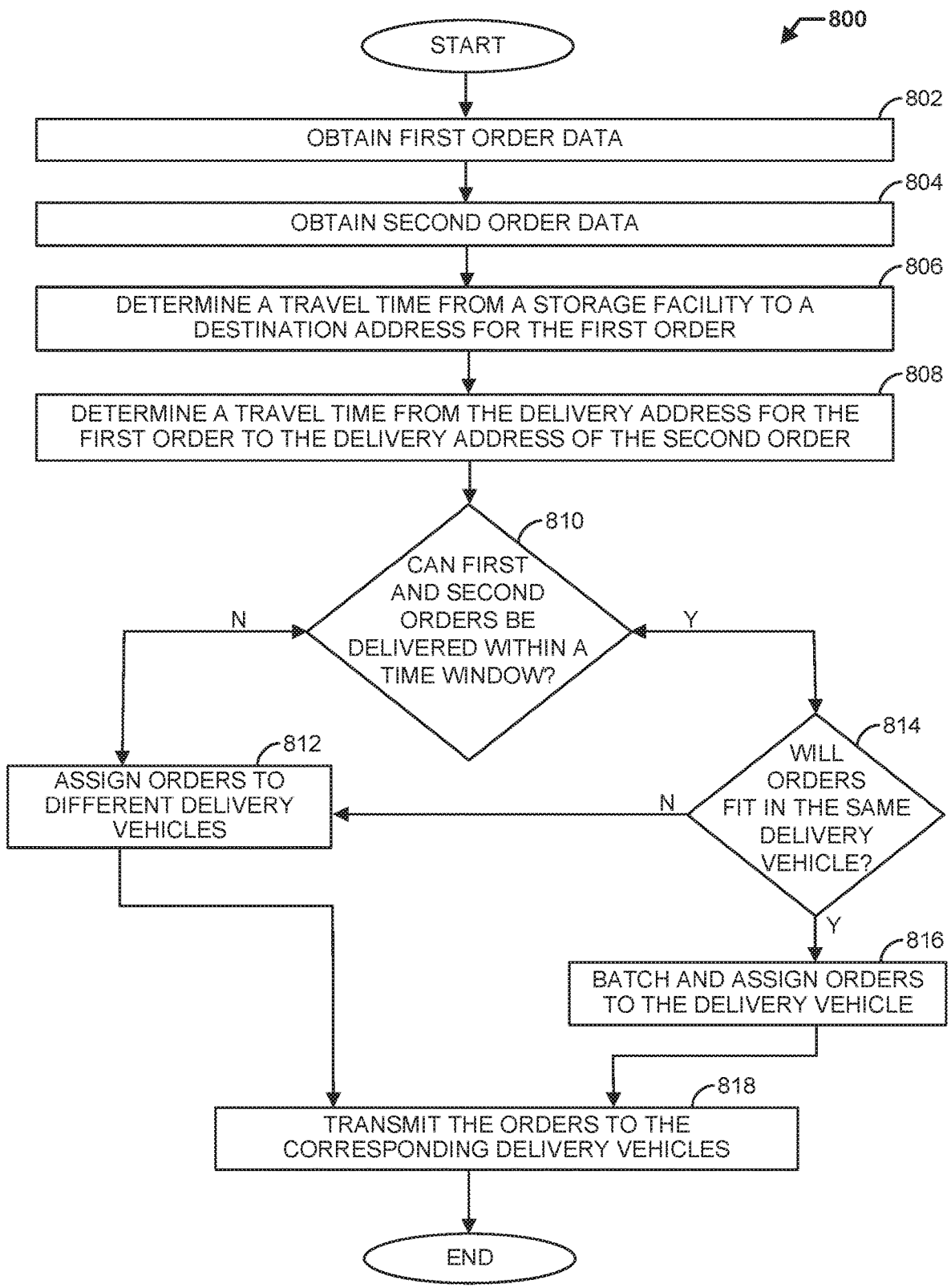
FIG. 8 is a flowchart of another example method that can be carried out by the delivery management computing device of FIG. 1 in accordance with some embodiments.

FIG. 8 is a flowchart of another example method 800 that can be carried out by, for example, the delivery management computing device 102 of FIG. 1. Beginning at step 802, first order data identifying an order for delivery, such data identifying first order data 604, is obtained. At step 804, second order data identifying a second order for delivery, such as $N^{th}$ order data 624, is obtained. Proceeding to step 806, a travel time from a storage facility to a destination address of the first order is determined. For example, the travel time from storage facility 302 to customer location 304 may be determined. In some examples, the travel time includes a loading time and a doorstep time at the delivery address of the first order. The method then proceeds to step 808, where a travel time from the destination address for the first order to the destination address of the second order is determined. For example, the travel time from customer location 304 to customer location 306 may be determined. In some examples, the travel time includes a doorstep time at the delivery address of the second order.

The method then proceeds to step 810, where a determination is made as to whether the first and second orders can be delivered within a time window. The time window may be, for example, a delivery time window that a delivery vehicle has accepted. For example, the determination may include computing a total travel time based on the travel times computed at steps 806 and 808, and comparing the total travel time to the delivery time window. If the first and second orders cannot be delivered within the time window, the method proceeds to step 812 where the first and second orders are assigned to different delivery vehicles. Otherwise, if the orders can be delivered within the time window, the method proceeds to step 814.

At step 814, a determination is made as to whether the orders will fit in a same delivery vehicle. The determination may be based, for example, on a cargo volume of the delivery vehicle, such as identified by delivery vehicle data 695. In some examples, a total item volume that includes the volume of all items for the first and second orders is computed. The total item volume is then compared to the cargo volume of the delivery vehicle to determine if the delivery vehicle has enough room to store the items for the first and second orders. If the items for both orders do not fit in the same delivery vehicle, the method proceeds to step 812, where the orders are assigned to different delivery vehicles. Otherwise, if the items for both orders do fit in the same delivery vehicle, the method proceeds to step 816, where a batched order is generated and assigned to the delivery vehicle. The batched order includes the first order and the second order.

From step 812 or step 816, the method proceeds to step 818 where the orders are transmitted to the corresponding delivery vehicles. For example, if the orders were not batched, the first order is transmitted to a first delivery vehicle, and the second order is transmitted to a second delivery vehicle. If, however, the orders were batched, the batched order is transmitted to the delivery vehicle that is to deliver the batched order that includes the first and second orders. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD- ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A batch order delivery management system comprising:
one or more memories;
a transceiver communicatively coupled with the one or more memories, the transceiver configured to receive order data identifying at least a first order and a second order, wherein the first order and the second order each include at least one item for delivery to a delivery address, and wherein the order data is stored in the one or more memories; and
one or more processors coupled to the one or more memories, the one or more processors configured to:
 obtain, from the one or more memories, the order data identifying at least a first order and a second order;
 process the order data to determine that the first order can be delivered to a first delivery address and the second order can be delivered to a second delivery address within a requested delivery time window, the determination comprising:
  determining a first travel time from a storage facility to the first delivery address based at least in part on a first distance between the storage facility and the first delivery address;
  determining a second travel time from the first delivery address to the second delivery address based at least in part on a second distance between the first delivery address and the second delivery address;
  determining an estimated total travel time of a delivery vehicle based on the first travel time and the second travel time; and
  comparing the estimated total travel time to the requested delivery time window;
 obtain, from the one or more memories, delivery vehicle data identifying a storage capacity for the delivery vehicle;
 determine that the delivery vehicle can store the items for the first order and the second order based on the storage capacity for the delivery vehicle;
 batch the first order and the second order to generate a batched order based on determining that the first order can be delivered to the first delivery address and the second order can be delivered to the second delivery address within the requested delivery time window and that the delivery vehicle can store the items for the first order and the second order;
 generate assignment data identifying an assignment of the batched order to the delivery vehicle;
 store the assignment data in the one or more memories;
 transmit the assignment data to a computing device associated with the delivery vehicle;
 implement a state machine including a first state element associated with the first order and a second state element associated with the second order, wherein a state of the first state element is partially dependent on a state of the second state element, and wherein the state of the second state element is partially dependent on the state of the first state element, wherein the state machine is configured to receive location data from the computing device associated with the delivery vehicle, and wherein the state machine is configured to:
 implement each of the first state element and the second state element in an enroute to pick up state;
 determining, based on the location data, when the delivery vehicle is at the storage facility;
 in response to determining the delivery vehicle is at the storage facility, updating each of the first state element and the second state element to a pickup location state;
 in response to receiving a loading input, updating each of the first state element and the second state element to an order pickup state;
 determining, based on the location data, when the delivery vehicle is leaving the storage facility;
 in response to determining the delivery vehicle is leaving the storage facility, update the first state element to an enroute to drop off state and transmit a communication to a user device indicating the delivery vehicle is enroute to deliver the first order;
 in response to receiving a skip order input for the first order:
  update the first state element to a skip order state;
  transmit skip data to the computing device associated with the delivery vehicle; and
  in response to updating the first state element to the skip order state, update the second state element to the enroute to drop off state;
 in response to receiving a delivered input for the first order, updating the first state element to a delivered state;
 in response to receiving a rejected input for the first order, updating the first state element to a rejected state;
 in response to updating the first state element to the delivered state or the rejected state, updating the second state element to the enroute to drop off state;
 in response to receiving a delivered input for the second order, updating the second state element to the delivered state;
 in response to receiving a rejected input for the second order, updating the second state element to the rejected state;
 in response to updating the first state element to the rejected state and the second state element to one of the rejected state or the delivered state, updating the first state element to an enroute to return state;
 determining, based on the location data, when the delivery vehicle is at the storage facility; and
 in response to determining the delivery vehicle is at the storage facility, updating the first state element to a returned state.

2. The batch order delivery management system of claim 1, wherein determining that the first order can be delivered to the first delivery address and the second order can be delivered to the second delivery address within the requested delivery time window comprises:
  determining an arrival time by the delivery vehicle at a storage facility storing the items for the first order and the second order;
  determining a loading time of the items for the first order and the second order into the delivery vehicle at the storage facility; and
  determining the estimated total travel time based on the arrival time, the loading time, the first travel time, and the second travel time.

3. The batch order delivery management system of claim 2, further comprising determining that the estimated total travel time is not greater than a period of the requested delivery time window.

4. The batch order delivery management system of claim 1, wherein the one or more processors are configured to:
  obtain, from the one or more memories, additional order data identifying at least a third order for at least one item;
  determine that the delivery vehicle cannot store the at least one item for the third order based on the storage capacity for the delivery vehicle; and
  adjust the assignment data to indicate a return to a storage facility after delivery of the first order and the second order.

5. The batch order delivery management system of claim 1, wherein the one or more processors are configured to:
  compare the storage capacity for the delivery vehicle to a total volume of the items for the first order and the second order; and
  determine that that the delivery vehicle can store the items for the first order and the second order based on the comparison.

6. The batch order delivery management system of claim 1, wherein the one or more processors are configured to:
  transmit a vehicle timeslot request to the delivery vehicle, wherein the vehicle timeslot request comprises a request to deliver the first order and the second order during the requested delivery time window; and
  receive, in response to the vehicle timeslot request, a vehicle timeslot reply accepting the request to deliver the first order and the second order during the requested delivery time window.

7. The batch order delivery management system of claim 6, wherein the vehicle timeslot request comprises a delivery price.

8. The batch order delivery management system of claim 1, wherein the one or more processors are configured to:
  determine at least one item of the first order or second order is a temperature sensitive item;
  determine a loading time of the items for the first order and the second order into the delivery vehicle at a storage facility; and
  determine whether the temperature sensitive item will be delivered within a maximum amount of time from the loading time,
  wherein batching the first order and the second order to generate the batched order is based on determining that the temperature sensitive item will be delivered within the maximum amount of time from the loading time.

9. The batch order delivery management system of claim 1, wherein the one or more processors are configured to:
  determine at least one event while the delivery vehicle is proceeding to the first delivery address;
  determine that the first order is to be skipped based on the at least one event;
  transmit the skip data to the delivery vehicle indicating that the delivery vehicle is to proceed to the second delivery address to deliver the second order; and
  update the first state and the second state based on the at least one event.

10. The batch order delivery management system of claim 9, wherein the at least one event is based on an indication that no one will be at the first delivery address to accept the first order.

11. The batch order delivery management system of claim 1 wherein the one or more processors are configured to:
  determine that the delivery vehicle is proceeding to the first delivery address; and
  generate the communication to the use device to a customer of the first order indicating an estimated delivery time for the first order based on determining that the delivery vehicle is proceeding to the first delivery address.

12. The batch order delivery management system of claim 1 wherein the one or more processors are configured to:
  receive, from the delivery vehicle, rejection data indicating that the first order was rejected; and
  in response to receiving the rejection data, transmit adjustment data indicating that the delivery vehicle is to return rejected items to the storage facility.

13. A computer-implemented method for batch order delivery management comprising:
  obtaining, by a processor and from a server, order data identifying at least a first order and a second order, each order for at least one item;
  processing, by the processor, the order data for determining that the first order can be delivered to a first delivery address and the second order can be delivered to a second delivery address within a delivery time window, the determination comprising:
  determining a first travel time from a storage facility to the first delivery address based at least in part on a first distance between the storage facility and the first delivery address;
  determining a second travel time from the first delivery address to the second delivery address based at least in part on a second distance between the first delivery address and the second delivery address;
  determining an estimated total travel time of a delivery vehicle based on the first travel time and the second travel time; and
  comparing the estimated total travel time to the delivery time window;
  obtaining, by the processor and from the server, delivery vehicle data identifying a storage capacity for the delivery vehicle;
  determining, by the processor, that the delivery vehicle can store the items for the first order and the second order based on the storage capacity for the delivery vehicle;
  batching, by the processor, the first order and the second order to generate a batched order based on determining that the first order can be delivered to the first delivery address and the second order can be delivered to the second delivery address within the delivery time window and that the delivery vehicle can store the items for the first order and the second order;

generating, by the processor, assignment data identifying an assignment of the batched order to the delivery vehicle;

storing, by the processor, the assignment data in a data repository;

transmitting, via a transceiver, the assignment data to a computing device associated with the delivery vehicle;

implementing, by the processor, a state machine including a first state element associated with the first order and a second state element associated with the second order, wherein a state of the first state element is partially dependent on a state of the second state element, and wherein the state of the second state element is partially dependent on the state of the first state element, wherein the state machine is configured to receive location data from the computing device associated with the delivery vehicle, and wherein the state machine is configured to:

implement each of the first state element and the second state element in an enroute to pick up state;

determining, based on the location data, when the delivery vehicle is at the storage facility;

in response to determining the delivery vehicle is at the storage facility, updating each of the first state element and the second state element to a pickup location state;

in response to receiving a loading input, updating each of the first state element and the second state element to an order pickup state;

determining, based on the location data, when the delivery vehicle is leaving the storage facility;

in response to determining the delivery vehicle is leaving the storage facility, update the first state element to an enroute to drop off state and transmit a communication to a user device indicating the delivery vehicle is enroute to deliver the first order;

in response to receiving a skip order input for the first order:
  update the first state element to a skip order state;
  transmit skip data to the computing device associated with the delivery vehicle; and
  in response to updating the first state element to the skip order state, update the second state element to the enroute to drop off state;

in response to receiving a delivered input for the first order, updating the first state element to a delivered state;

in response to receiving a rejected input for the first order, updating the first state element to a rejected state;

in response to updating the first state element to the delivered state or the rejected state, updating the second state element to the enroute to drop off state;

in response to receiving a delivered input for the second order, updating the second state element to the delivered state;

in response to receiving a rejected input for the second order, updating the second state element to the rejected state;

in response to updating the first state element to the rejected state and the second state element to one of the rejected state or the delivered state, updating the first state element to an enroute to return state;

determining, based on the location data, when the delivery vehicle is at the storage facility; and in response to determining the delivery vehicle is at the storage facility, updating the first state element to a returned state.

14. The method of claim 13 wherein determining that the first order can be delivered to the first delivery address and the second order can be delivered to the second delivery address within the delivery time window comprises:

determining an arrival time by the delivery vehicle at a storage facility storing the items for the first order and the second order;

determining a loading time of the items for the first order and the second order into the delivery vehicle at the storage facility; and determining the estimated total travel time based on the arrival time, the loading time, the first travel time, and the second travel time.

15. The method of claim 13 further comprising:

obtaining additional order data identifying at least a third order for at least one item; and determining that the delivery vehicle cannot store the at least one item for the third order based on the storage capacity for the delivery vehicle; and adjusting the assignment data to indicate a return to a storage facility after delivery of the first order and the second order.

16. The method of claim 13 further comprising:

determining at least one event while the delivery vehicle is proceeding to the first delivery address;

determining that the first order is to be skipped based on the at least one event; and transmitting the skip data to the delivery vehicle indicating that the delivery vehicle is to proceed to the second delivery address to deliver the second order.

17. The method of claim 16, wherein the at least one event is based on an indication that no one will be at the first delivery address to accept the first order.

18. A non-transitory computer readable medium having instructions stored thereon, wherein the instructions, when executed by at least one processor, cause a device to perform operations comprising:

obtaining, from a server, order data identifying at least a first order and a second order, each order for at least one item;

processing the order data for determining that the first order can be delivered to a first delivery address and the second order can be delivered to a second delivery address within a delivery time window, the determining comprising:

determining a first travel time from a storage facility to the first delivery address based at least in part on a first distance between the storage facility and the first delivery address;

determining a second total travel time from the first delivery address to the second delivery address based at least in part on a second distance between the first delivery address and the second delivery address;

determining an estimated total travel time of a delivery vehicle based on the first travel time and the second travel time; and comparing the estimated total travel time to the delivery time window;

obtaining, from the server, delivery vehicle data identifying a storage capacity for the delivery vehicle;

determining that the delivery vehicle can store the items for the first order and the second order based on the storage capacity for the delivery vehicle;

batching the first order and the second order to generate a batched order based on determining that the first order can be delivered to the first delivery address and the second order can be delivered to the second delivery address within the delivery time window and that the delivery vehicle can store the items for the first order and the second order;

generating assignment data identifying an assignment of the batched order to the delivery vehicle;

storing the assignment data in a data repository;

transmitting the assignment data to a computing device associated with the delivery vehicle;

implementing, by the processor, a state machine including a first state element associated with the first order and a second state element associated with the second order, wherein a state of the first state element is partially dependent on a state of the second state element, and wherein the state of the second state element is partially dependent on the state of the first element, wherein the state machine is configured to receive location data from the computing device associated with the delivery vehicle, and wherein the state machine is configured to:

implement each of the first state element and the second state element in an enroute to pick up state;

determining, based on the location data, when the delivery vehicle is at the storage facility;

in response to determining the delivery vehicle is at the storage facility, updating each of the first state element and the second state element to a pickup location state;

in response to receiving a loading input, updating each of the first state element and the second state element to an order pickup state;

determining, based on the location data, when the delivery vehicle is leaving the storage facility;

in response to determining the delivery vehicle is leaving the storage facility, update the first state element to an enroute to drop off state and transmit a communication to a user device indicating the delivery vehicle is enroute to deliver the first order;

in response to receiving a skin order input for the first order:
update the first state element to a skip order state;
transmit skin data to the computing device associated with the delivery vehicle; and
in response to updating the first state element to the skip order state, update the second state element to the enroute to drop off state;

in response to receiving a delivered input for the first order, updating the first state element to a delivered state;

in response to receiving a rejected input for the first order, updating the first state element to a rejected state;

in response to updating the first state element to the delivered state or the rejected state, updating the second state element to the enroute to drop off state;

in response to receiving a delivered input for the second order, updating the second state element to the delivered state;

in response to receiving a rejected input for the second order, updating the second state element to the rejected state;

in response to updating the first state element to the rejected state and the second state element to one of the rejected state or the delivered state, updating the first state element to an enroute to return state;

determining, based on the location data, when the delivery vehicle is at the storage facility; and in response to determining the delivery vehicle is at the storage facility, updating the first state element to a returned state.

19. The non-transitory computer readable medium of claim 18 further comprising instructions stored thereon that, when executed by at least one processor, further cause the device to perform operations comprising:

determining an arrival time by the delivery vehicle at a storage facility storing the items for the first order and the second order;

determining a loading time of the items for the first order and the second order into the delivery vehicle at the storage facility; and determining the estimated total travel time based on the arrival time, the loading time, the first travel time, and the second travel time.

20. The non-transitory computer readable medium of claim 18 further comprising instructions stored thereon that, when executed by at least one processor, further cause the device to perform operations comprising:

obtaining additional order data identifying at least a third order for at least one item; and determining that the delivery vehicle cannot store the at least one item for the third order based on the storage capacity for the delivery vehicle; and adjusting the assignment data to indicate a return to a storage facility after delivery of the first order and the second order.

* * * * *

UNITED STATES PATENT AND TRADEMARK OFFICE
CERTIFICATE OF CORRECTION

PATENT NO. : 11,783,403 B2
APPLICATION NO. : 16/393880
DATED : October 10, 2023
INVENTOR(S) : Pratosh Deepak Rajkhowa et al.

It is certified that error appears in the above-identified patent and that said Letters Patent is hereby corrected as shown below:

In the Claims

Claim 18, Column 23, Line 38, delete "skin" and insert -- skip --

Claim 18, Column 23, Line 41, delete "skin" and insert -- skip --

Page 1 of 1

Signed and Sealed this
Fourteenth Day of November, 2023

Katherine Kelly Vidal
*Director of the United States Patent and Trademark Office*